(12) United States Patent
Gao (10) Patent No.: US 11,600,296 B1
(45) Date of Patent: Mar. 7, 2023

(54) COMPOSITE HARD DISK DRIVE

(71) Applicant: Kaizhong Gao, North Oaks, MN (US)

(72) Inventor: Kaizhong Gao, North Oaks, MN (US)

( * ) Notice: Subject to any disclaimer, the term of this patent is extended or adjusted under 35 U.S.C. 154(b) by 0 days.

(21) Appl. No.: 17/559,214

(22) Filed: Dec. 22, 2021

(51) Int. Cl.
*G11B 20/12* (2006.01)

(52) U.S. Cl.
CPC .. *G11B 20/1217* (2013.01); *G11B 2020/1292* (2013.01)

(58) Field of Classification Search
None
See application file for complete search history.

(56) References Cited

U.S. PATENT DOCUMENTS

| | | | | |
|---|---|---|---|---|
| 6,468,670 B1* | 10/2002 | Ikeda | ............... | G11B 5/7368 |
| | | | | 428/669 |
| 2002/0131213 A1* | 9/2002 | Tsuchiya | ............ | B82Y 10/00 |
| 2007/0079315 A1* | 4/2007 | Mittersinker | ........ | G10H 1/0091 |
| | | | | 720/656 |
| 2008/0253023 A1* | 10/2008 | Lee | ................... | G11B 33/122 |
| 2013/0235491 A1* | 9/2013 | Mosendz | ................ | G11B 5/66 |
| | | | | 428/827 |
| 2017/0097877 A1* | 4/2017 | Dhanda | ................ | G11B 33/128 |
| 2022/0115039 A1* | 4/2022 | Matsumoto | ............ | G11B 13/08 |

* cited by examiner

*Primary Examiner* — Peter Vincent Agustin (57) ABSTRACT

A data storage method, apparatus and system that increase drive capacity, minimize latency, reduce write access time and improve drive lifetime is described in this invention. In one embodiment, the data storage device described here is a composite hard disk drive comprises a number of recording media platters labeled from 1 to n, where n is greater than or equal to 2; wherein there exist two positive integer n1 and n2, where n1 and n2 are between 1 and n; n1 is not equals to n2; wherein the data tracks for the media platters n1 and n2 are written based on one of the following: 1) different RTs; 2) different WAs; or 3) different RTs and different WAs.

20 Claims, 3 Drawing Sheets

COMPOSITE HARD DISK DRIVE

CROSS-REFERENCE TO RELATED APPLICATIONS

N/A

FIELD OF THE DISCLOSURE

The present disclosure relates to a magnetic recording method, data storage apparatus, device and system suitable for a data storage device, such as a hard disk drive, and the method to store data on a device.

BACKGROUND

The present disclosure relates to a magnetic recording method, data storage apparatus, device and system for increasing areal density capability (ADC), drive capacity (DC), write data rate (WDR) or the number of random write operations per second (Wops) for a hard disk drive device or system. Certain disclosed examples also help to manage how to write data in a hard disk drive to reduce failure rate and improve drive operation lifetime.

Magnetic data storage systems are utilized in a wide variety of devices in both stationary and mobile computing environments. Magnetic data storage systems include hard disk drives (HDD), and solid-state hybrid drives (SSHD) that combine features of a solid-state drive (SSD) and a hard disk drive (HDD). Examples of devices that incorporate magnetic storage systems include desktop computers, portable notebook computers, portable hard disk drives, servers, network attached storage, cloud storage racks, television set top boxes, digital cameras, digital video cameras, video game consoles, and portable media players, etc.

These numerous devices utilize magnetic storage systems, particularly HDD, for storing and retrieving digital information. Storage density is a measure of the quantity of digital information that can be stored on a given length of track, area of surface, or in a given volume of a magnetic storage medium. Higher density is generally more desirable since it allows greater volumes of data to be stored in the same physical space. Density generally has a direct effect on performance within a particular medium. Increasing the storage density of disks requires technological advances and changes to various components or storage subsystems of a hard disk. In some approaches, the storage density increase may incur other data storage system performance penalty, such as sequential write speed, random read/write operations measured by the number of read/write (or input/output) operations per seconds (Tops).

For a hard disk drive to have high performance or faster random read and write operations, additional media cache is utilized beyond dynamic random-access memory (DRAM) and other solid-state memory such as flash memory NAND based caches, to balance cost and performance. The DRAM and NAND based cache is typically referred to as the drive buffer, it is the temporary data storage embedded in the drive, not on the recording media surface. The additional media caches are typically selected on the media platter surface in specially designated zones. For ultra-high-capacity drives, such as HDD utilize shingled magnetic recording (SMR) write architecture (WA) or heat assisted magnetic recording (HAMR) technology with interlaced magnetic recording (IMR) write architecture (WA). Different write architecture (WA) will slow down the random write operation speed or write operations per second (Wops) number as compared to conventional magnetic recording (CMR) based on random access. The use of a media cache zone is of particular importance. Since the media cache and data share the same disk surface, the drive capacity is reduced with increasing media cache size. In addition, many of the new recording technologies (RTs) are based on various energy assisted magnetic recording technology, which add stress to the write head and reduce its lifetime.

Over the past few decades, all hard disk drives (HDDs) use the same recording technology (RT), same recording media and recording heads for a given drive. As component technology progresses approaching their physical limits, the new technology that can be utilized for HDD often provide benefits for ADC, but cost other drive performance penalties. For energy assisted magnetic recording (EAMR), the recording head complexity is increased with additional transducer and sensor needs to be integrated, which reduce yield and increase component cost. In addition, the recording head lifetime is reduced due to high energy density through the write pole tip region. For shingled magnetic recording (SMR), the incoming data needs to be stored or written in media cache, assembled together and rewritten into data bands, a large number of data tracks next to each other. This two-step process slows down Wops number significantly for data center applications when large number of users have write operation requests simultaneously. It will be ideal to have a hard disk drive solution to fully utilize both component and system level of technology to ensure high drive capacity (DC), while at the same time, will not pose performance or lifetime penalty.

SUMMARY

The presently disclosed embodiments address many of the issues described above with respect to the existing hard disk drive, particularly for high-capacity drives with a large number of platters per drive. The composite hard disk drive described herein addresses these disadvantages, provides a device solution for a high-capacity drive in a given form factor, utilizes both component and system ADC enablers, significantly reduces the latency penalty and the write operation access time which increases the Wops number as compared to SMR drive. The embodiments disclosed herein are suitable for use in many applications, particular for replacing current high-capacity hard disk drive which have a large number of platters per drive using SMR or potential future recording technology such as heat assisted magnetic recording (HAMR) and bit patterned media recording (BPMR) technologies.

In one embodiment, a hard disk drive comprises a number of platters labeled from 1 to n, where n is equals to or larger than 2; wherein there exist two number n1 and n2, where n1 and n2 are integers between 1 and n; n1 is not equals to n2; wherein the data tracks for the media platters n1 and n2 are written using one of the following: 1) different RT; 2) different WA; or 3) different RT and different WA.

BRIEF DESCRIPTION OF THE DRAWINGS

The foregoing aspects and many of the attendant advantages described herein will become more fully understood from the detailed description and the accompanying drawings and tables. The drawings constitute a part of this specification and include exemplary embodiments of the disclosure, which may be embodied in various forms. It is to be understood that in some instances, various aspects of the disclosure may be shown exaggerated or enlarged to facilitate an understanding of the disclosure; therefore, the drawings are not necessarily to scale. In addition, the embodiments depicted herein, like reference numerals in the various drawings, refer to the conceptual design of structural elements representing each particular component or element of the apparatus.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

In the following description, numerous specific details are disclosed to provide a thorough understanding of embodiments of the method, system and apparatus. One skilled in the relevant art will recognize, however, that embodiments of the method, system and apparatus described herein may be practiced without one or more of the specific details, or with other electronic devices, methods, components, and materials, and that various changes and modifications can be made while remaining within the scope of the appended claims. In other instances, well-known electronic devices, components, structures, materials, operations, methods, process steps and the like may not be shown or described in detail to avoid obscuring aspects of the embodiments. Embodiments of the apparatus, method and system are described herein with reference to figures.

Reference throughout this specification to "one embodiment," "an embodiment," or similar language means that a particular feature, structure, electronic device, method or characteristic described in connection with the embodiment is included in at least one embodiment. Thus, appearances of the phrases "in one embodiment," "in an embodiment," and similar language throughout this specification may refer to separate embodiments or may all refer to the same embodiment. Furthermore, the described features, structures, methods, electronic devices, or characteristics may be combined in any suitable manner in one or more embodiments.

Reference throughout this specification, the recording technology (RT) and the write architecture (WA) refers to the component magnetic RT and the WA utilized for the data track of the recording media platters for the hard disk drive. The term: media platter, recording media platter, recording media disk, platter and disk are often refers to the same component of the hard disk drive, i.e., a media platter or media platters in the hard disk drive.

With the numerous devices currently utilizing magnetic storage systems, hard disk drive (HDD) performance demands and design needs have intensified, including a need for increased storage capacity. There is an ongoing effort within the HDD industry to increase memory storage capacity while maintaining the same external drive form factors. Areal density (AD) is a measure of the number of bits that can be stored in a given unit of area, usually expressed in bits per square inch (BPSI). Being a two-dimensional measure, areal density is computed as the product of two one-dimensional density measures on the data track, namely linear density and track density. Linear Density is a measure of how closely bits are situated within a length of track, usually expressed in bits per inch (BPI), kilo-bits per inch (kbpi) or megabits per inch (Mbpi), and measured along the length of the tracks around a disk. Track Density is a measure of how closely the concentric tracks on the disk are situated, or how many tracks are placed in an inch of radius on the disk, usually expressed in tracks per inch (TPI) kilo-track per inch (ktpi) or mega-track per inch (Mtpi). The current demand for larger memory storage capacity in a smaller dimension is therefore linked to the demand for ever increasing storage track density.

Figure 1:
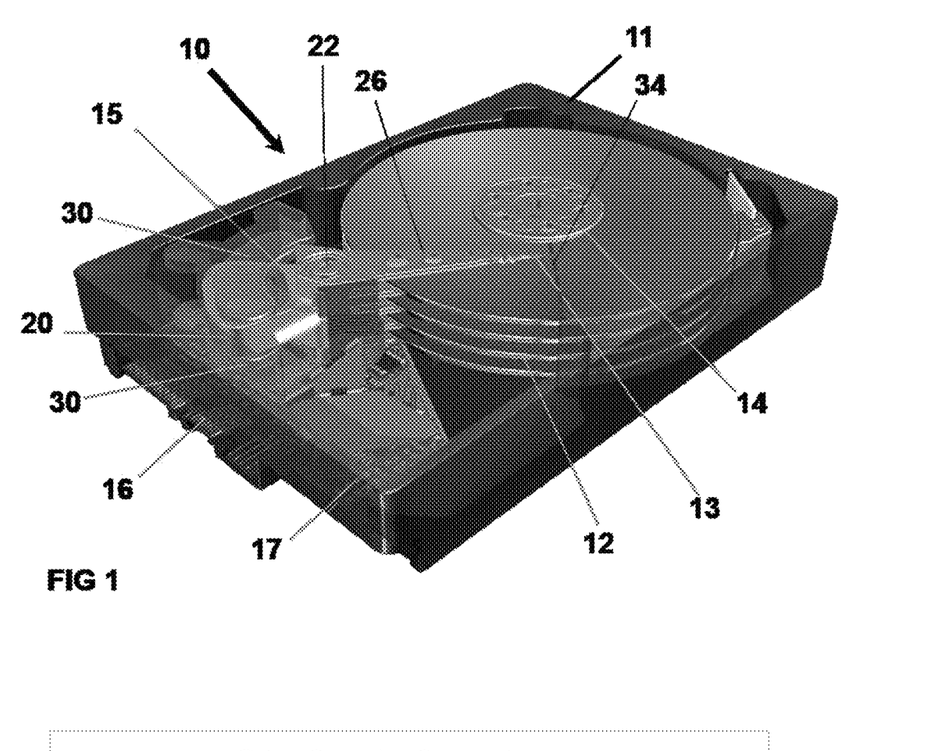
FIG. 1 is a perspective view of a typical hard disk drive in which embodiments are useful.

Referring to the figures wherein identical reference numerals denote the same elements throughout the various views, FIG. 1 illustrates a HDD data storage system 10, in which embodiments are useful. Features of the discussion and claims are not limited to this particular design, which is shown only for purposes of the example. Disk drive 10 includes base plate 11 that may be disposed of on a top cover forming a sealed environment to protect internal components from contamination. Disk drive 10 further includes one or more data storage disks or platters 12 of computer-readable data storage media. Typically, both of the major surfaces of each data storage disk 12 include a plurality of concentrically disposed tracks for data storage purposes. Each data storage disk 12 is mounted on a spindle 14, which in turn is rotatably interconnected with a base plate 11 and/or cover. Multiple data storage disks 12 are typically mounted in vertically spaced and parallel relation on the spindle motor 14. A spindle motor 14 rotates the data storage disks 12 at an appropriate rate.

The disk drive 10 also includes an actuator arm assembly 15 that pivots about a pivot bearing 22, which in turn is rotatably supported by the base plate 11 and/or cover. The actuator arm assembly 15 includes one or more individual rigid actuator arms 26 that extend out from near the pivot bearing 22. Multiple actuator arms 26 are typically disposed in vertically spaced relation, with one actuator arm 26 being provided for each major data storage surface of each data storage disk 12 of the disk drive 10. Movement of the actuator arm assembly 15 is provided by an actuator arm drive assembly, such as a voice coil motor 20 or the like. The voice coil motor (VCM) 20 is a magnetic assembly that controls the operation of the actuator arm assembly 15 under the direction of control electronics 17.

A suspension 13 is attached to the free end of each actuator arm 26 and cantilevers therefrom. The slider is disposed of at or near the free end of each suspension. What is commonly referred to as the read/write head (e.g., transducer) is mounted as a head unit under the slider and is used in disk drive read/write operations. In practice, additional sensors and transducers are built along with the read/write head to ensure reliable read and write operations. The slider and the transducer are both too small to show in FIG. 1, therefore are not shown here. As the suspension 13 moves, the slider moves along an arc path 34 and across the corresponding data storage disk 12 to position the head unit at a selected position on the data storage disk 12 for the disk drive read/write operations. The read/write head senses and/or changes the magnetic fields stored on the disks.

Perpendicular magnetic recording (PMR) involves recorded bits that are stored in a generally planar recording layer in a generally perpendicular or out-of-plane orientation. A PMR read head and a PMR write head are usually formed as an integrated read/write head on an air-bearing slider. When the disk drive 10 is not in operation, the actuator arm assembly 15 may be pivoted to a parked position utilizing ramp assembly. The head unit is connected to a preamp via head wires routed along the actuator arm 26, which is interconnected with the control electronics 17 of the disk drive 10 by a flex cable that is typically mounted on the actuator arm assembly 15. Signals are exchanged between the head unit and its corresponding data storage disk 12 for disk drive read/write operations.

The typical hard disk drive has one actuator arm assembly 15 that includes all individual rigid actuator arms 26 with recording heads that extend out from near the pivot bearing 22. The actuator arm assembly 15 is controlled by one VCM 20. This type of hard disk drive is called one actuator hard disk drive. Another type of hard disk drive uses two or more actuator arm assembly 15, each actuator arm assembly 15 has multiple actuator arms controlled by its own VCM 20. This type of hard disk drive is called dual actuator drive or multiple actuator drive. For a hard disk drive with multiple actuators, different actuator assemblies are labeled as A1, A2 . . . , where A1 and A2 represent each actuator assemblies respectively in a hard disk drive with dual actuators. Each actuator arm assembly 15 may consist of multiple recording heads, and operated by change of its own VCM 20 coil current. For the case of multiple actuator drives, the actuator arm assemblies 15 are mounted in the same place, with the same pivot point 22. Thus, in top-down view, the first actuator 26 overlaps with all other actuators.

The data storage disks 12 include a plurality of embedded servo sectors each comprising coarse head position information, such as a track address, and fine head position information, such as servo bursts. As the recording head passes over each servo sector, a read/write channel processes the read signal emanating from the head to demodulate the position information. The control circuitry processes the position information to generate a control signal applied to the VCM 20. The VCM 20 rotates the actuator arm 26 in order to position the head over a target track during the seek operation, and maintains the head over the target track during a tracking operation. The head unit may utilize various types of read sensor technologies such as giant magnetoresistive (GMR), tunneling magnetoresistive (TMR), other magnetoresistive technologies, or other suitable technologies.

There is an ongoing effort within the magnetic recording industry to increase memory storage capacity. Typically, different types of HDD are labeled by the write technology (also referred to as: the recording technology or RT) utilized in drive operation, with the current technology called perpendicular magnetic recording (PMR), and corresponding HDD called PMR drive.

There are a number of recording technologies (RTs) that can be utilized for a hard disk drive. Beyond current products use perpendicular magnetic recording (PMR), there are still other recording technologies (RTs), such as: heat assisted magnetic recording (HAMR), the microwave assisted magnetic recording (MAMR), other energy assisted magnetic recording (EAMR), bit patterned media recording (BPMR) and heated dot magnetic recording (HDMR).

PMR drive involves recorded bits that are stored in a generally planar recording layer in a generally perpendicular or out-of-plane orientation. In a PMR drive, the recording technology (RT) is based on PMR. The corresponding components such as recording media and recording head are all optimized for PMR technology. In PMR drive, higher ADC requires smaller bits, which cause thermal instabilities. To avoid this, media with high magneto-crystalline anisotropy (Ku) may be used. However, increasing Ku also increases the coercivity of the media, which can exceed the write field capability of the write head.

Since it is known that the coercivity of the magnetic material of the recording layer is temperature dependent, one method to address thermal stability and increased coercivity is to use heat-assisted magnetic recording (HAMR or in some place, also called: thermally assisted magnetic recording or TAMR), wherein high-Ku magnetic recording material is heated locally during write operation by the write head to lower the coercivity enough for writing to occur, then let the coercivity/anisotropy to be high enough for thermal stability of the recorded bits at the ambient temperature of the disk drive (e.g., the normal operating or "room" temperature of approximately 20-30 □C.). In some HAMR systems, the magnetic recording material is heated to near or above its Curie temperature. The recorded data is then read back at the ambient temperature by a conventional magnetoresistive read head, e.g., a giant magnetoresistance (GMR) or tunneling magnetoresistance (TMR) based read head. One type of HAMR disk drive uses a laser source and an optical waveguide coupled to a transducer, e.g., a near-field transducer (NFT), for heating the recording material on the disk. A near-field transducer is an optical device with subwavelength features used to concentrate the light delivered by the waveguide into a spot smaller than the diffraction limit and at distance smaller than the wavelength of light. In a HAMR head, the NFT is typically located at the air-bearing surface (ABS) of the slider that also supports the read/write head, and rides or "flies" above the disk surface while creating an optical spot on the disk. In a HAMR drive, the recording technology is based on HAMR. The corresponding components such as recording media and recording head are all optimized for HAMR technology. Note that due to additional optical energy being utilized to heat up the recording media by a few hundreds of degrees, the total energy density at the writing location is high as compared to PMR, therefore, typically HAMR head lifetime is low as compared to PMR. For a large capacity drive with large workload, significant effort to improve write head reliability and lifetime is still needed to achieve a reliable HAMR drive.

Another energy assisted magnetic recording technology is called microwave assisted magnetic recording (MAMR). In MAMR, a high radio frequency (rf) magnetic field is delivered to the recording layer during write process, typically by adding spin-torque oscillator (STO), which generates rf field at several to tens of gigahertz, which help recording media reduce its switching field. This additional structure will be integrated with a perpendicular magnetic recording (PMR) head, therefore, MAMR write head is also different from standard PMR head, which includes an STO structure as well as an electric current path that drives the STO to produce an rf magnetic field. Since in MAMR, the media switching field is reduced, therefore, the recording head can be utilized to write higher anisotropy media and with a smaller grain size. The MAMR media will have higher anisotropy, smaller grain size and different microstructure as compared to PMR media. In a MAMR drive, the recording technology is based on MAMR. The corresponding components such as recording media and recording head are optimized for MAMR technology.

There are other energy assisted magnetic recording technologies, such as energy/electric current assisted magnetic recording (EAMR) where an additional electric current flows through the write pole tip. This electric current is called assisted current if it is passing through the writer's shield. The electric current will enable writer pole tip complete the magnetization switching and reach saturation magnetization state faster than conventional PMR head in the write operation. The added field also helps recording media switching. In EAMR drive, the recording technology is based on EAMR. The corresponding components such as recording media and recording head are all optimized for EAMR technology.

In another approach, a current can be applied through the write pole tip into the recording media. This is typically called the shunt current, and the recording technology is often referred to as current assisted magnetic recording (CAMR). The shunting current will help to reduce the media switching field due to self-heating. In CAMR drive, the recording technology is based on CAMR. The corresponding components such as recording media and recording head are all optimized for CAMR technology.

There are other magnetic recording technologies, such as bit patterned media recording (BPMR) or heated dot magnetic recording (HDMR), where the recording media is based on well aligned discrete dot patterns and the recording head will be optimized for that particular media. In the case of HDMR, additional thermal energy is applied to the media dot during the write process. In any of the energy assisted magnetic recording technologies mentioned above, the recording head and recording media needs to be designed and optimized particular for that technology, and typically their design, structure, materials, processes to be different from PMR head and media. Each of the energy assisted technologies require large changes of recording head and media component change, and they are often referred to as component technology for ADC enablers.

In addition to component technology to enable DC, there are different write architecture (WA) technologies that can be utilized for HDD. Throughout this disclosure, the write architecture (WA) can be defined as: conventional magnetic recording (CMR); shingled magnetic recording (SMR); interlaced magnetic recording (IMR); blocked magnetic recording (BMR). The write architecture (WA) in traditional HDDs, called conventional magnetic recording (CMR), has each data track being accessed, both in read and write operations, in a random fashion. This allows drive operation at a fast speed. There are alternative write architectures (WAs) that have been proposed or implemented for different data storage products.

One of the WAs is called shingled magnetic recording (SMR), where the data track is grouped into data bands. Each band consists of a large number (typically larger than 10) of data tracks. Within each band, the written in data in the consecutive tracks partially overwrite or trim the previous written track. By optimizing recording head design and media properties, higher storage capacity can be achieved using SMR. In SMR, the trim of tracks within a band or between different bands next to each other is always from one side.

Another WA is called interlaced magnetic recording (IMR). In IMR, the recording data track is labeled as top/bottom tracks (or even/odd tracks). The bottom (odd) tracks are written before the top (even) track write. Therefore, the bottom (odd) track can be written with a wide track pitch, which enables high kbpi. The top (even) track has limited ATI, as it will not experience a written pattern in any of the neighboring tracks. Therefore, the top (even) track can be optimized for ktpi. The IMR with HAMR can further improve the ADC of the HAMR HDD.

A more generalized WA is called blocked magnetic recording (BMR). In BMR, the neighboring data tracks can be differentiated as top, middle and bottom tracks, and several tracks can be grouped into bands. Different from SMR, the trim of tracks between neighboring tracks can be from opposite directions. The number of middle tracks within one band can be multiple tracks. In case the number of middle tracks is dropped to zero, the BMR is returned to the configuration of IMR. In case the number of middle tracks within one band is zero on one side, while the opposite side is not respective to the top track, the BMR is returned to the configuration of SMR. In other words, the IMR and SMR are both special configurations of BMR.

For WA other than CMR, the data track is not being written in a completely random fashion. Therefore, when a large number of incoming write requests are received simultaneously, the drive has to organize the data in such a way to write data tracks following the architecture set by the firmware. It is not only adding the complexity of the write operations, but also slowing down the write operations. There are many different ways to improve efficiency, as compared to CMR, SMR, IMR or BMR all has performance penalty which is typically reflected by reduced the number random write operations per second (Wops) capability a hard disk drive can achieve. To mitigate this effect, one of the approaches is to create CMR based media buffer zones/tracks on small regions of the disk surface for each recording media disk platter surface, and write the data temporarily before it can be organized, packed or optimized, then put the organized data to dedicated bands or tracks. These media buffer zones are typically called media cache. As compared to other approaches using DRAM and NAND flash storage for drive cache, this approach is more cost effective. The additional media cache will take part of the recording space on the media platter otherwise can be utilized for store data. Therefore, an increase in media cache size as a percentage of recording media platter area improves the write performance, but the total DC will be reduced. For SMR drive, the media cache is written in CMR mode, different from the data track using the same recording head. The same recording head on that media surface has to be operated in dual modes. The same recording media has to be optimized for both CMR and SMR. This often leads to an ADC penalty in the media cache zone. Therefore, a larger area is desired for the media cache zone in order to mitigate the performance penalty. No matter what RT or WA is utilized in a HDD.

In all existing large capacity HDDs, there are a number of platters in each HDD assembly, only one RT and one WA is utilized within the drive for its data tracks. In one embodiment, a composite hard disk drive comprises a number of platters labeled from 1 to n, where n is equals to or larger than 2; wherein there exist two number n1 and n2, where n1 and n2 are integers between 1 and n; n1 is not equals to n2; wherein the data tracks for the media platters n1 and n2 are written using one of the following: 1) different RT; 2) different WA; or 3) different RT and different WA.

Figure 2:
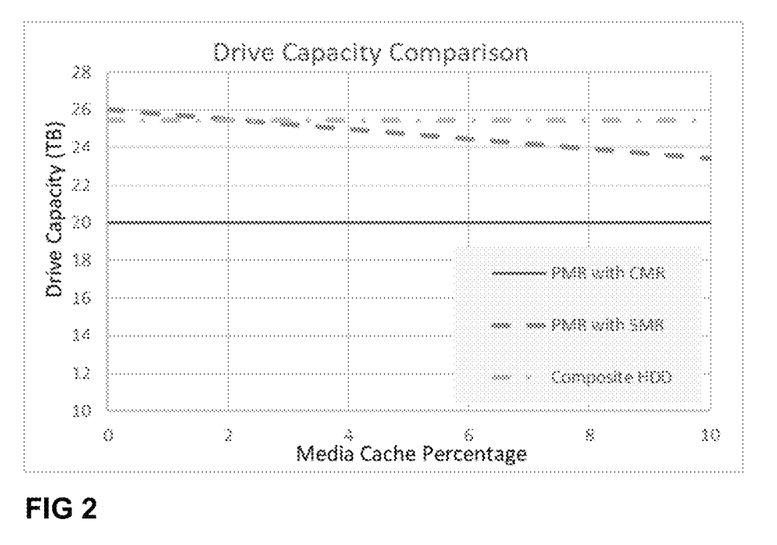
FIG. 2 illustrates the drive capacity comparison for the proposed composite hard disk drive vs. conventional hard disk drive.

FIG. 2 illustrates the drive capacity comparison for the proposed composite hard disk drive vs. conventional hard disk drives in one of the embodiments of the present invention. Both the composite HDD, CMR and SMR drives are based on 10 platters HDDs. The composite HDD has one CMR disk platter and 9 SMR disk platters. CMR PMR have 2 TB/disk, and SMR PMR have 2.6 TB/disk when neglect media cache space requirement, representing 30% gain can be possibility realized for SMR WA. Due to finite media cache size, a small percentage DC loss will be realized in a SMR drive, and this penalty is increased with the media cache size. The composite HDD DC does not change, since there is no additional media cache zone required. In composite HDD, the recording head can be optimized for each recording media surface. There will be no additional penalty for using SMR head to write in CMR mode. Therefore, both CMR disk platter and SMR disk platter can be optimized with its own recording head and media to realize maximum DC.

Figure 3:
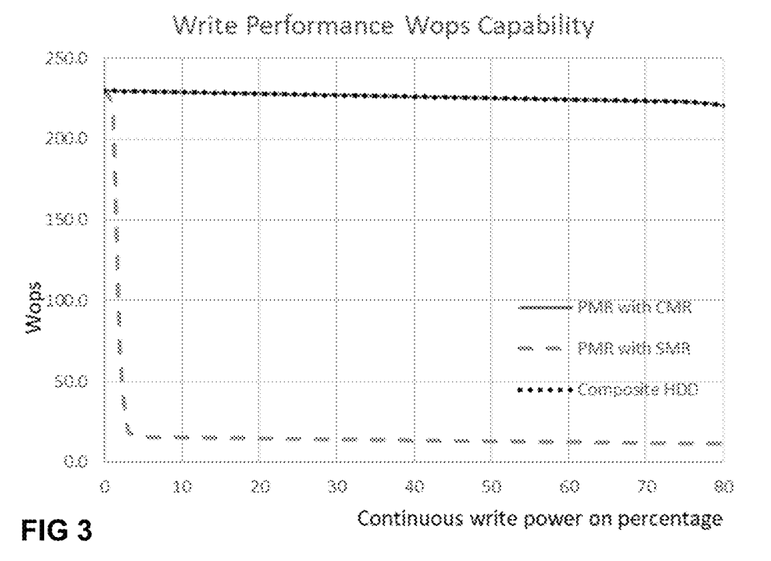
FIG. 3 illustrates the drive performance comparison for the proposed composite hard disk drive vs. conventional hard disk drive.

FIG. 3 illustrates the drive write performance for the proposed composite hard disk drive vs. conventional hard disk drives in one of the embodiments of the present invention. Both the composite HDD, CMR and SMR drives are based on 10 platters HDDs. The results show that for SMR drives, as soon as the write workload is increased, the media cache is occupied, the drive has to start packing the data and conducting band writing. The SMR drive random write performance will be degraded by an order of magnitude or more. The conventional HDD does not incur such a penalty even for a relatively large workload. The composite hard disk drive will also not incur such a penalty even for a relatively large workload. This is due to the CMR disk embedded in the composite HDD, which provides a significantly large data storage space that can both be used as the media cache zones for other disk platters, and at the same time, used as a direct data storage area. This benefit is due to the fact that using a composite hard disk drive, all the disk platter surfaces on that disk can be served as the data zone. No separate media cache on disk platters is needed.

Figure 4:
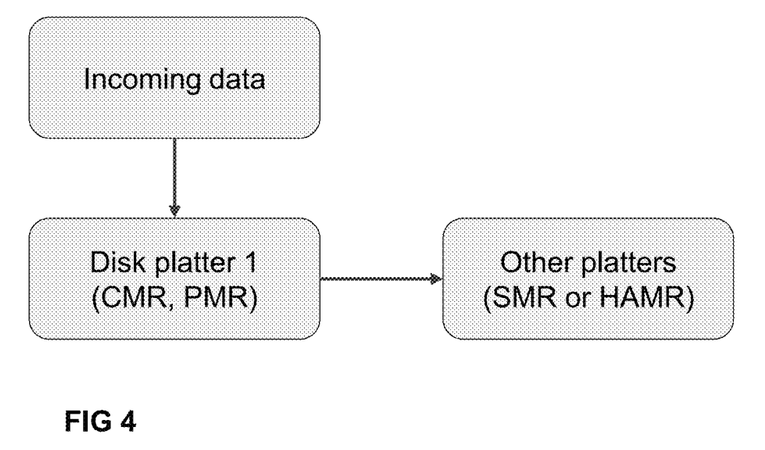
FIG. 4 illustrates one type of write method for a composite hard disk drive as described in an embodiment of the proposed data storage device.

FIG. 4 illustrates one type of write method for a composite hard disk drive as described in an embodiment of the proposed data storage device. The incoming written data was initially stored in the solid state cache. In a CMR drive, the data is directly written to target data tracks assigned by the drive firmware based on the availability of the data sectors or data tracks, the position of current recording heads, etc. The selection of a disk platter to write a particular information can be chosen in random fashion. In a SMR drive, the data is directly written to the media cache zones that spread on all disk platters. Then the data will be organized when there are no external read/write requests. This condition is also called HDD in idle condition. In composite HDD, one of the methods is to write all incoming data into a particular disk platter n1. In one embodiment, this disk platter n1 is using CMR WA. In another embodiment, the disk platter n1 is using PMR RT. The data will be organized when the drive is idle, and the data is then being moved or written into other disk platters using different WA, or different RT.

Figure 5:
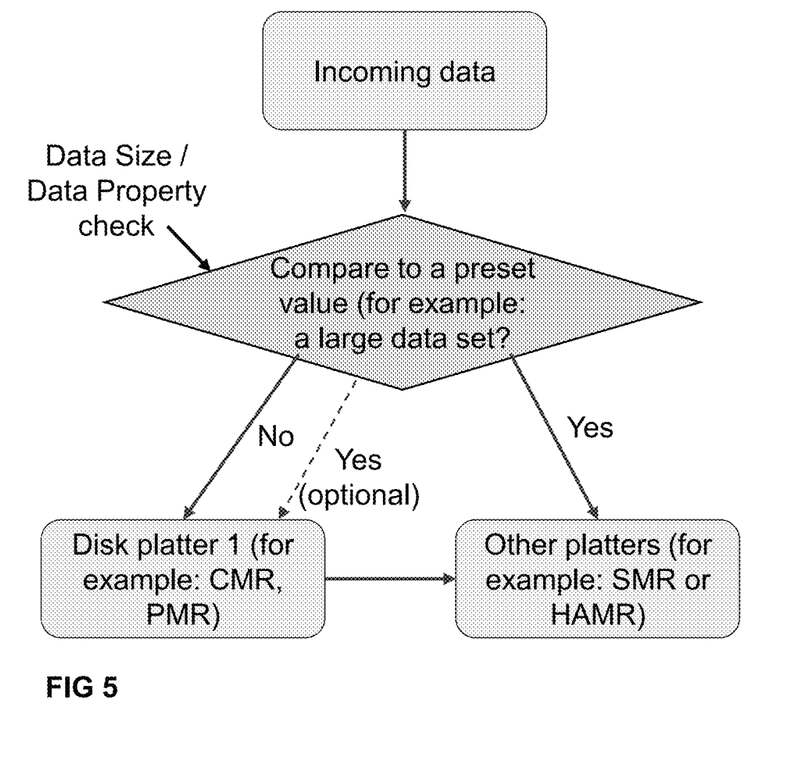
FIG. 5 illustrates another type of write method for a composite hard disk drive as described in an embodiment of the proposed data storage device.

FIG. 5 illustrates another type of write method for a composite hard disk drive as described in an embodiment of the proposed data storage device. The incoming written data was initially stored in the solid state cache. The drive firmware will check characteristics or properties of data, such as the size of data, the origin of data, the history of data creation and modification etc. And then determine which disk platter is utilized to write that particular data file. In one embodiment, the composite HDD can use the data file size as a determining factor, and use a preset value. For all data files smaller than the preset value, the data file is written into disk platter n1, wherein the disk platter n1 is based on CMR WA. For a data file larger than the preset value, the data file is directly written into disk platters other than n1, i.e. into a band when the other disk platter is based in SMR WA. In an embodiment where other disk platters are using SMR WA, the preset value can be the data size of a given band using SMR. In another embodiment, a large data file can be stored into different disk platters. After comparing the preset value, a large portion of the file can be written into disk platter other than n1 (represented by the solid arrow). The remainder of the data file is stored into disk n1 (represented by the dashed arrow). A small data file is written into disk platter n1. The data files on disk n1 are then moved, packed and rewritten on other disks within the same drive when there are no incoming read and write requests.

In another embodiment, the data property can include other aspects of data files, the origin of data, the history of data creating and modification etc., use of smart algorithms can also help to determine and decide if particular data files need to be rewrite frequently. The composite HDD can assign small data files and data files that are likely to be rewrite frequently to be written to disk n1, and keep them on disk platter n1, wherein disk platter n1 can be based on PMR. While assigning other files or organizing other files and rewriting them to other disk platters. This approach is of particular importance, since for the assisted technologies, the recording head lifetime is limited. Using the optimized write method for composite HDD allows PMR head and media to handle most write operations, and reduce other platters write frequency and power one time. Thus can help to prolong the whole HDD lifetime.

Any of the above mentioned composite hard disk drive embodiments provide significant benefit as compared to conventional hard disk drives. In addition to ensure high DC with high Wops, the composite hard disk drive also allow additional optimization and redistribution of the write load, which will further improve the drive lifetime. In most energy assisted recording technology such as HAMR, MAMR, EAMR etc., the recording head lifetime is limited due to high energy density near the write pole tip during the write operations, use of composite hard disk drive can significantly reduce the required continuous write operation time for the write head corresponding to the less reliable part of the drive. This composite hard disk drive will become a big enabler to allow HAMR and other energy assisted magnetic recording technology to be implemented into hard disk drive products.

In various embodiments, the composite hard disk drive can use a first and a second RT. One of the preferred embodiments is to have one disk use the first RT, and all other disks use the other RT. In a preferred embodiment, the first RT is based on PMR. In other embodiments, the hard disk drive can use a first and a second WA. One of the preferred embodiments is to have one disk use the first WA, and all other disks use the other WA. In a preferred embodiment, the first WA is based on CMR.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A hard disk drive comprises a number of recording media platters labeled from 1 to n, where n is greater than or equal to 2; wherein there exist two positive integer n1 and n2, where n1 and n2 are between 1 and n; n1 is not equals to n2; wherein the data tracks for the media platters n1 and n2 are written based on one of the following: 1) different RTs; 2) different WAs; or 3) different RTs and different WAs.

2. A composite hard disk drive according to aspect 1, wherein the RTs are selected from: perpendicular magnetic recording (PMR), heat or thermally assisted magnetic recording (HAMR), microwave assisted magnetic recording (MAMR), electric current/energy assisted magnetic recording (EAMR), current assisted magnetic recording (CAMR), other energy assisted magnetic recording (XAMR), bit patterned media recording (BPMR) and heated dot magnetic recording (HDMR).

3. A composite hard disk drive according to aspect 1, wherein the WAs are selected from: conventional magnetic recording (CMR), shingled magnetic recording (SMR), interlaced magnetic recording (IMR), blocked magnetic recording (BMR) and other magnetic recording (XMR) write architecture.

4. A composite hard disk drive according to aspect 1, wherein recording media platters n1 and n2 have at least one of the following to be different: magnetic layer coercivity, magnetic grain size, number of magnetic layers on disk surface, magnetic layer or interlayer thickness, magnetic or interlayer materials composition, interlayer thickness, overcoat or lubricant materials composition or thickness, magnetic layer and interlayer structure or microstructures, type of substrate.

5. A composite hard disk drive according to aspect 1, further comprising recording heads, each associated with a respective one of the media platters and has a design, material, structure, number of sensors and transducer integrated or critical specification specific to the media platter with which the recording head is associated.

6. The composite hard disk drive according to aspect 5, wherein the critical specification for each of the recording heads comprises at least one of the following: write pole width, write pole height, writer yoke dimensions, shield geometry and structure, heater shape, heater size and location, materials utilized for writer, existence of additional NFT or oscillator, and the number of contact pads.

7. A composite hard disk drive according to aspect 1, wherein the first RT is utilized for one media platter, the second RT is utilized for all other media platters.

8. A composite hard disk drive according to aspect 1, wherein the first RT is based on PMR.

9. A composite hard disk drive according to aspect 1, wherein the first RT is based on PMR, the second RT is based on HAMR.

10. A composite hard disk drive according to aspect 1, wherein one of the WAs is based on CMR.

11. A composite hard disk drive according to aspect 1, wherein the WA used for disk n1 is based on CMR, the WA used for other disk platters in the same drive is based on SMR.

12. A composite hard disk drive according to aspect 1, wherein two actuator arm assemblies are utilized, each of the actuator arm assembly controls a different number of recording heads.

13. A method to write information to a composite hard disk drive comprising multiple media platters labeled from 1 to n, where n is greater than or equal to 2; wherein there exist a positive integer n1 between 1 and n; comprises the following steps:
(a) Writing incoming data files to disk platter n1;
(b) Moving data files written in step (a) from disk platter n1 to other disk platters in the same drive.

14. The method to write information to a composite hard disk drive according to aspect 13, wherein the disk platter n1 uses CMR WA for its data tracks.

15. The method to write information to a composite hard disk drive according to aspect 13, wherein the disk platter n1 uses PMR RT for its data tracks.

16. The method to write information to a composite hard disk drive according to aspect 13, wherein the step (b) is performed when there are no incoming read or write requests.

17. A method to write information to a composite hard disk drive comprising multiple media platters labeled from 1 to n, where n is greater than or equal to 2; wherein there exist a positive integer n1 between 1 and n; comprises the following steps:
(a) Determine the incoming data file property and compared to a preset value;
(b) Writing part or all incoming data file to disk platters other than n1 when data file property exceed the preset value; and
(b1) writing remainder part of data file to disk platter n1; or
(b2) writing remainder part of data file to other disk platter in the same drive;
(c) Writing incoming data files to disk platter n1 when data file property does not exceed the preset value;
(d) Moving small data files written in step (c) from disk platter n1 to other disk platters in the same drive when there are no read and write requests.

18. The method to write information to a composite hard disk drive according to aspect 17, wherein the incoming data file property and the preset value are based on the file size.

19. The method to write information to a composite hard disk drive according to aspect 18, wherein the preset value is equal to the size of a data band in the drive.

20. The method to write information to a composite hard disk drive according to aspect 17, wherein the disk platter n1 uses CMR WA for its data tracks.

21. The method to write information to a composite hard disk drive according to aspect 17, wherein the disk platter n1 uses PMR RT for its data tracks.

22. The method to write information to a composite hard disk drive according to aspect 17, wherein the step (d) is performed when there are no incoming read or write requests.

23. A composite hard disk drive (HDD) assembly comprises: a head slider comprising a magnetic read/write head for reading data from and writing data to two or more magnetic-recording disks, a magnetic-recording disk rotatably mounted on a spindle on each side of disk surface; a voice coil actuator configured to move the head slider to access portions of the magnetic-recording disk; and an HDD enclosure in which said head slider, disk, spindle and voice coil actuator are enclosed; a metal container within which said HDD is enclosed; wherein a number of recording media platters labeled from 1 to n, where n is greater than or equal to 2; wherein there exist two positive integer n1 and n2, where n1 and n2 are between 1 and n; n1 is not equals to n2; wherein the data tracks for the media platters n1 and n2 are written based on one of the following: 1) different RTs; 2) different WAs; or 3) different RTs and different WAs.

24. A composite hard disk drive according to aspect 23, wherein the RTs are selected from: perpendicular magnetic recording (PMR), heat or thermally assisted magnetic recording (HAMR), microwave assisted magnetic recording (MAMR), electric current/energy assisted magnetic recording (EAMR), current assisted magnetic recording (CAMR), other energy assisted magnetic recording (XAMR), bit patterned media recording (BPMR) and heated dot magnetic recording (HDMR).

25. A composite hard disk drive according to aspect 23, wherein the WAs are selected from: conventional magnetic recording (CMR), shingled magnetic recording (SMR), interlaced magnetic recording (IMR), blocked magnetic recording (BMR) and other magnetic recording (XMR) write architecture.

26. A composite hard disk drive according to aspect 23, wherein recording media platters n1 and n2 have at least one of the following to be different: magnetic layer coercivity, magnetic grain size, number of magnetic layers on disk surface, magnetic layer or interlayer thickness, magnetic or interlayer materials composition, interlayer thickness, overcoat or lubricant materials composition or thickness, magnetic layer and interlayer structure or microstructures, type of substrate.

27. A composite hard disk drive according to aspect 23, further comprising recording heads, each associated with a respective one of the media platters and has a design, material, structure, number of sensors and transducer integrated or critical specification specific to the media platter with which the recording head is associated.

28. The composite hard disk drive according to aspect 27, wherein the critical specification for each of the recording heads comprises at least one of the following: write pole width, write pole height, writer yoke dimensions, shield geometry and structure, heater shape, heater size and location, materials utilized for writer, existence of additional NFT or oscillator, and the number of contact pads.

29. A composite hard disk drive according to aspect 23, wherein the first RT is utilized for one media platter, the second RT is utilized for all other media platters.

30. A composite hard disk drive according to aspect 23, wherein the first RT is based on PMR.

31. A composite hard disk drive according to aspect 23, wherein the first RT is based on PMR, the second RT is based on HAMR.

32. A composite hard disk drive according to aspect 23, wherein one of the WAs is based on CMR.

33. A composite hard disk drive according to aspect 23, wherein the WA used for disk n1 is based on CMR, the WA used for other disk platters in the same drive is based on SMR.

34. A composite hard disk drive according to aspect 23, wherein two actuator arm assemblies are utilized, each of the actuator arm assembly controls a different number of recording heads.

35. A method to write information to a composite hard disk drive comprising multiple media platters labeled from 1 to n, where n is greater than or equal to 2; wherein there exist a positive integer n1 between 1 and n; comprises the following steps:
(a) Determine the incoming data file size and compared to a preset value;
(b) Writing incoming large data files, i.e. the data file size is larger than a pre-set value, to disk platters other than n1;
(c) Writing incoming small data files, i.e. the data file size is smaller than a pre-set value, to disk platter n1;
(d) Moving small data files written in step (a) from disk platter n1 to other disk platters in the same drive.

36. The method to write information to a composite hard disk drive according to aspect 35, wherein the disk platter n1 uses CMR WA for its data tracks.

37. The method to write information to a composite hard disk drive according to aspect 35, wherein the disk platter n1 uses PMR RT for its data tracks.

38. The method to write information to a composite hard disk drive according to aspect 35, wherein the step (d) is performed when there are no incoming read or write requests.

In practice, the composite HDD uses a recording media and recording head that matches with the recording media for each media platter surface. Since each media platter is corresponding with a given RT with the matching recording head. Each recording subsystem including the recording head and media are optimized to match with each other. There is little interaction between disks during read and write operations, as compared to conventional SMR approach when different WA between data tracks and media cache zones. Different recording media platters can still be mounted on the same disk spindle with minimal change to the drive architecture. Different recording heads can be mounted on its own slider, and connected with the same actuator arm with all recording head assembly to be of the same form factor. Therefore, the integration of this type of HDD will induce minimal change. Since PMR recording technology with CMR WA has been developed with reliable recording head and media. All other media platters and the recording heads will have less write-power-on hour during 5 years' service life time. Therefore, this will help to effectively reduce the required head lifetime for all other recording heads in the same drive. In the composite HDD, both capacities, write operation performance and the drive lifetime can be improved simultaneously.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents. Modifications and variations may be made to the disclosed embodiments while remaining within the spirit and scope of the method, system and apparatus. The implementations described above and other implementations are within the scope of the following claims.

What is claimed is:
1. A composite hard disk drive, comprising:
a number of recording media platters labeled from 1 to n, wherein:
n is greater than or equal to 3;
there is an integer n1 between 1 and n;
n1 is less than n/2;
the recording media platter labeled from 1 to n1 are written using a first recording technology (RT);
all other recording media platters of the number of recording media platters are written using a second RT that is different from the first RT.
2. The composite hard disk drive as claimed in claim 1, wherein the RTs are selected from:
perpendicular magnetic recording (PMR), heat or thermally assisted magnetic recording (HAMR), microwave assisted magnetic recording (MAMR), electric current/energy assisted magnetic recording (EAMR), current assisted magnetic recording (CAMR), other energy assisted magnetic recording (XAMR), bit patterned media recording (BPMR) and heated dot magnetic recording (HDMR).

3. The composite hard disk drive as claimed in claim 1, wherein the write architectures (WAs) are selected from: conventional magnetic recording (CMR), shingled magnetic recording (SMR), interlaced magnetic recording (IMR), blocked magnetic recording (BMR) and other magnetic recording (XMR) write architecture.

4. The composite hard disk drive as claimed in claim 1, wherein the recording media platters labeled from 1 to n1 have at least one of the following to be different from the recording media platters labeled from n2 to n:
magnetic layer coercivity, magnetic grain size, number of magnetic layers on disk surface, magnetic layer or interlayer thickness, magnetic or interlayer materials composition, interlayer thickness, overcoat or lubricant materials composition or thickness, magnetic layer and interlayer structure or microstructures, type of substrate.

5. The composite hard disk drive as claimed in claim 1, further comprising recording heads:
each associated with a respective one of the media platters and has a design, material, structure, number of sensors and transducer integrated or critical specification specific to the media platter with which the recording head is associated.

6. The composite hard disk drive as claimed in claim 5, wherein:
the critical specification for each of the recording heads comprises at least one of the following: write pole width, write pole height, writer yoke dimensions, shield geometry and structure, heater shape, heater size and location, materials utilized for writer, existence of additional NFT or oscillator, and the number of contact pads.

7. The composite hard disk drive as claimed in claim 1, wherein:
the first RT is utilized for one media platter,
the second RT is utilized for all other media platters.

8. The composite hard disk drive as claimed in claim 1, wherein the first RT is based on PMR.

9. The composite hard disk drive as claimed in claim 1, wherein the disk platters using the first RT is based on CMR write architecture (WA).

10. The composite hard disk drive as claimed in claim 1, wherein two actuator arm assemblies are utilized, each of the actuator arm assembly controls a different number of recording heads.

11. The composite hard disk drive as claimed in claim 1, wherein each of the recording media platters does not have media cache zones.

12. A composite hard disk drive, comprising:
a number of recording media platters labeled from 1 to n, wherein:
n is greater than or equal to 3;
there is an integer n1 between 1 and n, wherein:
n1 is less than n/2;
the recording media platter labeled from 1 to n1 are written using a first write architecture (WA);
all other recording media platters of the number of recording media platters are written using a second WA that is different from the first WA; and
the recording head and recording media surface corresponding to the first WA and the second WA has a design, material, structure, number of sensors and transducer integrated or critical specification to be different.

13. The composite hard disk drive as claimed in claim 12, wherein each of the recording media platters does not have media cache zone.

14. The composite hard disk drive as claimed in claim 12, wherein the write architectures (WAs) are selected from: conventional magnetic recording (CMR), shingled magnetic recording (SMR), interlaced magnetic recording (IMR), blocked magnetic recording (BMR) and other magnetic recording (XMR) write architecture.

15. The composite hard disk drive as claimed in claim 12, wherein n1 equals to 1, and n is equal or larger than 4.

16. The composite hard disk drive as claimed in claim 12, wherein the first WA is CMR.

17. The composite hard disk drive as claimed in claim 12, wherein the disk platters using the first WA is based on PMR.

18. A composite hard disk drive, comprising:
a number of recording media platters labeled from 1 to n, wherein:
n is greater than or equal to 3;
there is an integer n1 between 1 and n:
the recording media platter labeled n1 is written using a first recording technology (RT) or a first write architecture (WA);
all other recording media platters of the number of recording media platters are written using a second RT or a second WA; and
the recording head and recording media surface corresponding to recording media platter labeled n1 has a design, material, structure, number of sensors and transducers integrated or critical specification to be different from the recording head and recording media surface corresponding to other recording media platters.

19. The composite hard disk drive as claimed in claim 18, wherein
all other recording media platters that is not labeled as n1 do not have a media cache zone.

20. The composite hard disk drive as claimed in claim 18, wherein:
the disk platter n1 use PMR RT or CMR WA; and
all other recording media platters use HAMR RT or SMR WA.

* * * * *